United States Patent Office 3,443,415
Patented May 13, 1969

3,443,415
DIFFERENTIAL FLAME IONIZATION CHROMATOGRAPHIC ANALYSIS
Edwin K. Clardy, Bartlesville, Okla., assignor to Phillips Petroleum Company, a corporation of Delaware
Filed Sept. 9, 1966, Ser. No. 578,386
Int. Cl. G01n 31/08
U.S. Cl. 73—23.1
12 Claims

ABSTRACT OF THE DISCLOSURE

In an apparatus and method for analysis of fluids, a sample to be analyzed and a reference fluid are simultaneously introduced into separate chromatographic columns, then submitted to examination in separate flame ionization detectors which are electrically arranged so as to provide an output representative of the differential in the ionization of the sample and reference fluids, the level of current through the ionization detectors being variable in such a way as to control the base level of the differential indication.

Figure 1:
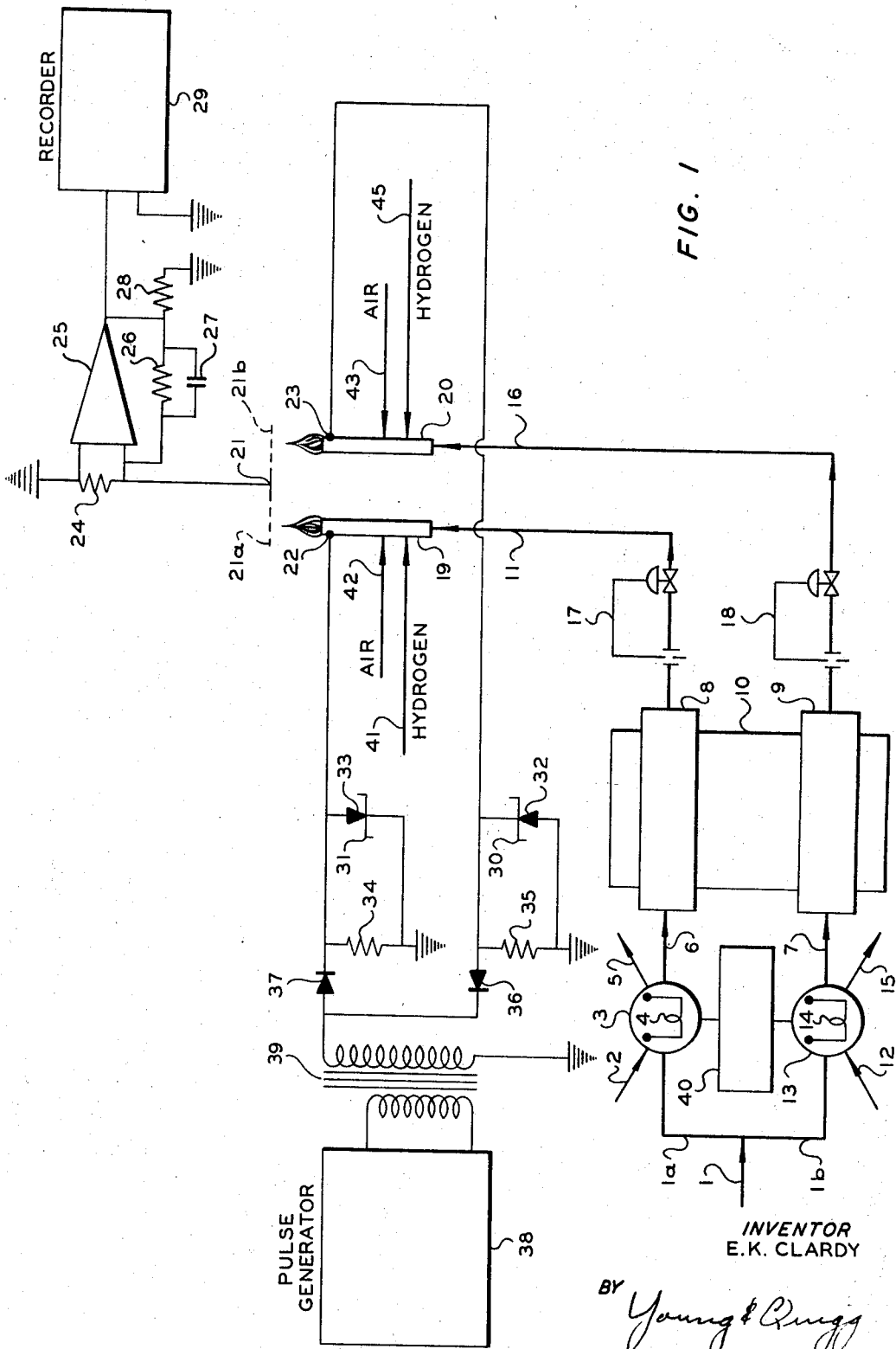

This invention relates to analysis of fluid samples. In another aspect, this invention relates to a novel method of and apparatus for analyzing fluid samples using a double ionization detector.

In various industrial and laboratory operations, there is a need for analytical procedures which are capable of measuring small concentrations of constituent in fluid mixtures. One analytical procedure which presently is becoming quite valuable in fluid analysis involves elution chromatography. In elution chromatography, a sample of the material to be analyzed is introduced into a column which contains a selective sorbent. A carrier gas is directed to the column so as to force the constituents of the sample through the column. The sorbent attempts to hold the constituents in the sample column whereas the carrier gas tends to push the constituents through the column. This results in the several constituents of the fluid sample travelling through a column at different rates of speed, depending upon their affinities for the packing material. The individual constituents of the fluid sample thus appear in the effluent from the column in sequence. It is common practice to detect these constituents by means of a thermal conductivity analyzer which compares the thermal conductivity of the effluent gas with the thermal conductivity of the carrier gas introduced into the column.

Recently a novel analysis procedure was disclosed by the inventor, Albert M. Platt, in U.S. Patent 3,112,640, whereby the sensitivity of the chromatographic analyzer using a thermal conductivity type detector was substantially increased. The above-mentioned patent discloses a method of analysis wherein a first signal is established which corresponds to the output signal of the analyzer when a standard mixture of predetermined composition is supplied to the analyzer. This first signal is then subtracted from a second signal which corresponds to the analysis of a sample material so that any difference between them is measured. Only differences between the compositions are recorded as positive or negative signals and the sensitivity of the recorder is thus increased substantially. This invention is an improvement of the above-mentioned patent.

According to one embodiment of the invention, a differential ionization detector controlled by square wave pulse generator is used to measure the composition of the sample fluid. Ionization detectors are much more sensitive than the conventional thermistor type detectors and their use will provide the sensitivity which is desired to carry out certain trace analysis. Each ionization detector is supplied with a stream of hydrogen and a free oxygen containing gas, such as air. First and second electrodes are positioned adjacent the flame of the burner, and a potential difference is applied between the electrodes. A fluid stream to be analyzed is introduced into the flame so that any combustible constituents therein are burned. Any electrical conduction between the spaced electrodes is measured by suitable indicating current. When hydrogen alone is burned, the electrical conduction between the two electrodes is substantially zero; however, combustible gases such as hydrocarbons produce ions in in the flame which conduct electricity between the spaced electrodes. The measurement of the current between the electrodes thus provides an indication of the presence of combustible constituents in the fluid stream to be analyzed. The differential ionization detector of this invention uses two jets which also function as electrodes and a common ionization grid or collector which is in turn attached to an amplifier device. Carrier gas is introduced into two chromatographic columns, and each column in turn is connected to one side of the differential ionization detector. Next, a reference fluid of known composition is introduced into one of the gas streams, and the same reference fluid containing sample is introduced into the other gas stream. The signals from one burner are subtracted form the signals from the other burner by passing the signals through the amplifier. Therefore, by varying the relative pulse widths to the differential ionization detector, the flow rates of the first and second streams, and the temperature of the columns, a non-fluctuating output from the differential ionization detector is obtained, and each composition of sample constituent is represented by the differences betwen the compositions of the two streams as measured by the differential ionization detector.

Accordingly, one object of this invention is to provide an improved chromatographic analyzer.

Another object of this invention is to provide an improved method for analyzing samples in elution chromatography by utilizing an electrically pulsed differential ionization detector.

A further object of this invention is to provide an improved apparatus for analyzing fluid samples of elution chromatography.

Figure 2:
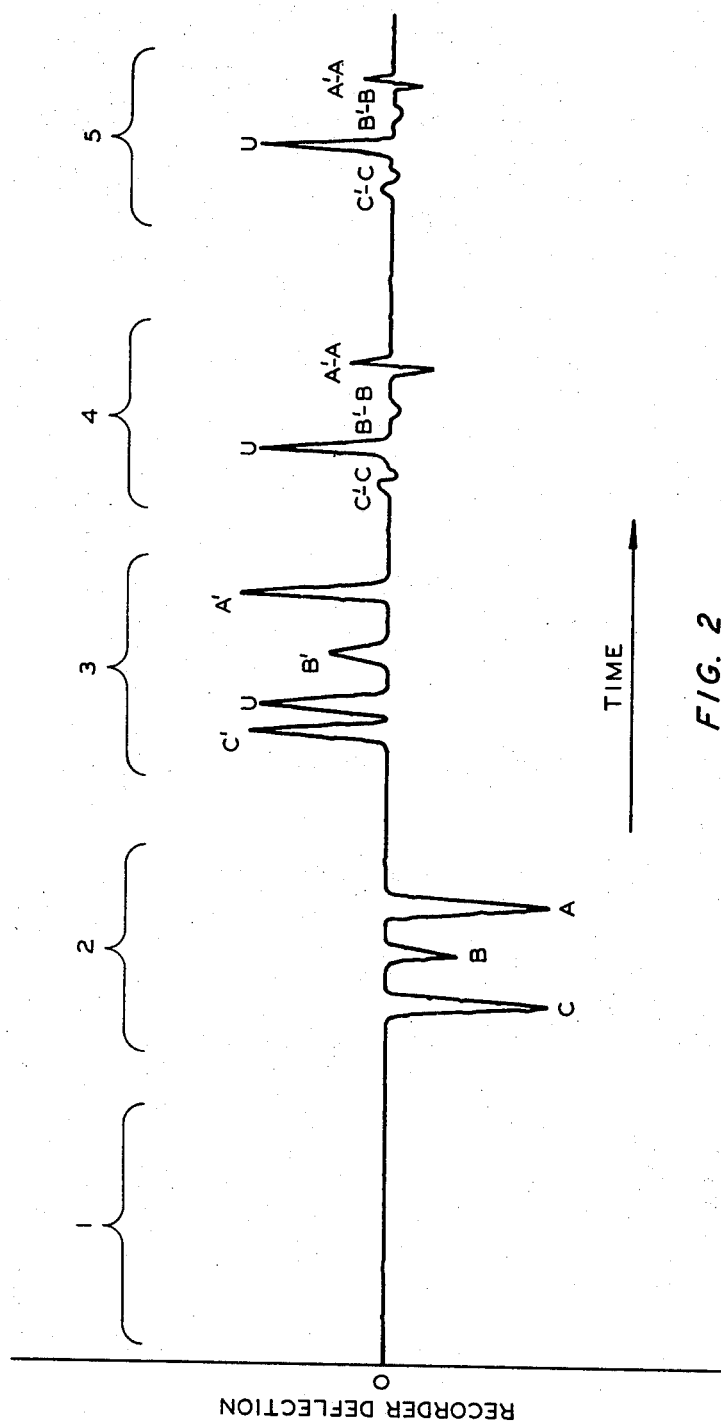

Other objects, advantages and features of this invention should become apparent from the following detailed description taken in conjunction with the accompanying drawings in which FIGURES 1 is a schematic representation of the preferred circuit diagram of the invention. FIGURE 2 is a graphical representation of a typical record produced by this invention.

Referring now to the drawings in detail and to FIGURE 1 in particular, there is shown valve means 3 with conduits 1a, 2, 5 and 6 and sample loop 4 operatively attached thereto and valve means 13 with conduits 1b, 12, 15 and 7 and sample loop 14 operatively attached thereto. Valves 3 and 13 can both be the pneumatic operated valve mechanism disclosed in U.S. Patent 3,140,615. Valve means 3 and 13 are controlled by programmer 40. Conduits 6 and 7 communicate with columns 8 and 9, respectively. These columns may be filled with any material known in the art which selectively retards passage therethrough of the individual constituents of a fluid mixture. Various types of solid adsorbents and liquid adsorbents dispersed on inert solids are known for this purpose. Heating unit 10 is operatively connected to columns 8 and 9 whereby the columns may be heated separately or simultaneously at the time or different rates. Columns 8 and 9 communicate with conduits 11 and 16, respectively, and fluid flow in conduits 11 and 16 is controlled by flow controllers 17 and 18, respectively. Alternatively, flow controllers 17 and 18 can be placed in conduits 1a and 1b, respectively. Conduits 11 and 16 communicate with electrode burners 19 and 20, respectively. Air is introduced into the electrode burners 19 and 20 through conduits 42 and 43, respectively, and hydrogen is introduced into the electrode burners through 41 and 45, respectively. FIGURE 1 illustrates a premixed flame wherein air and hydrogen are premixed with sample compounds before the stream is burned. However, this invention is applicable to the non-premixed flame wherein air or oxygen is added above the flame to form the atmosphere around the flame. The electrode burners receive pulsed electrical signals from the square wave pulse generator 38 through electrical junctions 22 and 23. Pulse generator 38 may be any type of pulse generator known in the art, such as model 104 manufactured by Data Pulse Incorporated, 509 Hindry Ave., Englewood, Calif. This type pulse generator which operates at a maximum of 10 mc. per second and 14 volts with a pulse width range from .5 microsecond to .5 millisecond makes it possible to vary the width of the more positive portion of the pulse wave with respect to the width of the more negative portion of the wave. As previously stated, the standard square wave pulse generators have a maximum voltage of about 14 volts; therefore, the voltage to electrical junctions 22 and 23 may be increased by using a transformer 39. This transformer may be any type known in the art, and a ratio can be chosen to step up the voltage to junctions 22 and 23 to a maximum of about 300 volts depending upon the relative composition of the sample constituents to be analyzed. However, voltages above 300 volts can be used, if desired. Thus, in the operation of the pulse generation system, the positive current flows through rectifier 37 and through the voltage regulation system comprising rectifier 33, Zener diode 31, and resistance 34 on to the electrical junction 22. Negative current flows through rectifier 36 to the voltage regulation system comprising rectifier 32, Zener diode 30 and resistance 35 on to electrode junction 23. Therefore, a potential difference is applied between the positive electrode burner 19 and electrode 21a, resistance 24 and ground and between negative electrode burner 20 and electrode 21b, resistance 24 and ground. The positive and negative pulses received on 21a and 21b are then added in an amplifier comprising an operational amplifier 25 having a parallel resistance 26 and capacitance 27 in its feedback circuit with the output being taken between the feedback circuit and resistance 28 which is connected to ground. The amplifier will reject any signal above the frequency of the chromatographic peaks to thereby eliminate any outside noise or hum, but it will add the positive and negative pulses received on 21a and 21b that are representative of the chromatographic peaks. The output signal is then fed to recorder 29. This recorder may be any type used in the art, such as strip chart recorders.

At the beginning of the analysis cycle, valves 3 and 13 are placed in a first position by programmer 40 so that carrier gas flows from conduit 1 through conduits 1a and 1b, valves 3 and 13 and into conduits 6 and 7, and reference gas containing sample flows through conduit 2, sample loop 4 and out vent line 5 while reference gas flows through conduit 12, sample loop 14 and out vent line 15. The carrier gas then flows through columns 8 and 9, conduits 11 and 16 and into electrode burners 19 and 20. An integrated signal is then recorded by recorder 29. The sample columns may obtain residual sorbed components, and when heat is applied to them as is necessary in the analysis of higher hydrocarbons, it will cause these sorbed components to elute through the columns and cause unwanted bleedoff. This in turn will cause the base or reference line on the recording instrument to shift. Therefore, it is necessary to reshift the reference line before introducing the sample and reference into the first column and the reference into the second column. It has been found, that by varying the pulsed voltages to the jets of the differential ionization detector, the signals from the jets will cancel each other and thereby reduce the reference line shift and bring it back to a horizontal position. This may be explained mathematically as follows: As previously stated the differential ionization detector uses two jets that burn hydrogen, reference and sample and a common ionization grid or collector. The output voltage is proportional to the difference between ions produced at electrode burners 19 and 20, or $$V_{out} = K_1 J_1 - K_2 J_2$$

J = output voltage due to a jet,
$J_1$ = output voltage due to electrode burner 19,
$J_2$ = output voltage due to electrode burner 20,
K = attenuation factor which is a measure of the amount of the current carried through the gap between the electrode burner and the receiving grid, or
$K_1$ = measure of amount of current carried between electrode burner 20 and grid 21b.
$K_2$ = measure of amount of current carried between electrode burner 20 and grid 21b.

$$0 \leq K \leq 1$$

This attenuation factor is determined empirically. Since the medium through which both currents travel is the same for both burners, $K_1$ is approximately equal to $K_2$, therefore, $V_{out}$ is approximately equal to $K(J_1-J_2)$, or in terms of the residual bleedoff, $V_{out} = K(J \text{ drift } 1 - J \text{ drift } 2)$.

Therefore, by varying the percent of time voltage is applied to the jets, the resultant output voltage may be thus varied. For example, if the first column (column 8) has considerable more bleedoff than the second column (column 9), then $J_1$ will be greater than $J_2$ due to the increased ionization of flame 1 and $V_{out}$ will reflect this difference. By broading the width of the pulse applied to the second electrode (electrode burner 20) until the two jets have equal gains, the resultant outputs from the two jets will cancel and the reference line on the recorder will remain constant. When this reference line shift has been reduced and the reference line remains constant, valves 3 and 13 are then placed in a second position and the carrier gas from conduit 1a enters sample loop 4 and pushes the reference fluid containing sample from the loop through conduit 6 and into column 8 and carrier gas from conduit 1b enters sample loop 14 and pushes reference fluid from loop 14 through conduit 7 into column 9. At this time, reference fluid containing sample from conduit 2 is venting through conduit 5, and reference fluid from conduit 12 is venting through conduit 15. Valves 3 and 13 are then changed to the first position, allowing the carrier gas to flow through both columns simultaneously. As previously stated, electrode burner 20 receives negative pulses and electrode burner 19 receives positive pulses from the square wave pulse generator 38. This results in opposite but equal signals received on 21b and 21a for the same constituents in the carrier gas running through both columns. To receive a smooth integrated output from the recorder, it is necessary to bring about the coherence of the reference components at the detector. Coherence is defined as the simultaneous arrival at grid 21 of a positive and a negative signal for the same component in streams flowing through conduits 11 and 16 from columns 8 and 9, respectively. When these signals simultaneously arrive at grid 21, then the amplifier will add these signals and the resulting output for the same component will be zero. This coherence may be accomplished by varying the temperatures of the column to assure that the same components will travel through the two columns at similar times, and by adjusting the flow rates with flow controllers 17 and 18 to assure that the same volume per unit time enters the detector. As the above-mentioned adjustments are being made, the sample components are eluted through column 8 and carried through conduit 11 into electrode burner 19. When the reference line is zero and coherence of the constituents in the two streams is brought about, the output on recorder 29 will be a representation of the composition of the sample. This is illustrated mathematically as follows:

$$J_1 = K(J \text{ sample} + J \text{ drift } 1)$$
$$J_2 = J \text{ drift } 2$$
$$V_{out} = K(J \text{ sample} + J \text{ drift } 1) - J \text{ drift } 2$$

or $$V_{out} = K \text{ sample} + K(J \text{ drift } 1 - J \text{ drift } 2)$$

It must be understood that ($J$ drift 1 — $J$ drift 2) does not have to equal zero, but the difference may equal any predetermined amount. Therefore, the feature of varying the pulse width to one electrode compared to the pulse width of the other is to reduce the shift of the reference line to a desired position.

Also, in commercial operations, it may be desirable to connect a DC battery with a constant output to one electrode burner. The square wave pulse generator to the other electrode burner. The square wave pulse generator will be attached to the dummy or reference column to offset drifts due to bleedoff from the sample column.

As an example of the operation of this analyzer, a reference is made to the analysis of a fluid mixture comprising 34 percent n-butane, 28 percent propane, 25 percent butadiene, 12 percent isobutane, and 1 percent isopentane. The reference fluid is a mixture of 37 percent propane, 45 percent n-butane, 16 percent isobutane, and 2 percent isopentane. All values being on a mole basis. The chromatographic columns employed are 4 meters long and ¼ inch in diameter, and contain silicone oil deposited on crushed fire brick. Helium forms the carrier gas and flows through the columns at a rate of 60 cc./min. The voltage to the jets are adjusted so that a non-fluctuating reference line is obtained as shown by area 1 of FIGURE 2 which is a reproduction of the graph chart from the recorder. One cc. of reference fluid is introduced into the column atached to the negative pulsed electrode and eluted into the detector. The signal from the detector is illustrated by area 2 of FIGURE 2. A=propane, B=isobutane, C=n-butane. Next, a one cc. portion of reference plus sample is introduced into the column attached to the positive pulsed electrode and eluted to the detector. The signal from the detector is illustrated by area 3 of FIGURE 2. The above-mentioned steps are then carried out simultaneously, and the signal from the detector is illustrated by area 4 of FIGURE 2. Area 5 of FIGURE 2 illustrates the effect of varying the temperature of the columns and the flow rate through the columns. In areas 3, 4 and 5 of FIGURE 2 the isopentane peaks are hidden by other peaks and $u$ represents the composition of butadiene.

I claim:
1. A method of analyzing a fluid sample which comprises:
   (a) simultaneously introducing a first carrier gas stream into a first chromatographic column and a second carrier gas stream into a second chromatographic column;
   (b) passing the said first and second carrier gas streams through a first and second electrode burner respectively of a differential ionization detector wherein at least one of said electrode burners is operated by a square wave pulsed current, and varying the pulse widths of said square wave pulsed current to balance any difference in output between the said electrode burners due to elution of residual sorbed components from prior runs through the chromatographic columns to thereby yield a non-fluctuating output from said differential ionization detector; and
   (c) introducing sample components contained in a reference fluid into said first carrier gas stream and introducing a reference fluid into said second carrier gas stream and passing said fluids into the said first and second chromatographic columns, through which the said sample components are eluted in sequence, varying the flow rate of the said first and second streams and the temperature of the said first and second columns to bring about coherence of the two streams at the detector means, and measuring the property of the effluent from the said first and second columns which is representative of the differences of the compositions thereof, said measurement being the differential output of the said differential ionization detector.

2. The method of claim 1 wherein one of the electrodes of the said differential ionization detector is operated by direct current, and the other electrode of the said differential ionization detector is operated by square wave pulsed current.

3. The method of claim 1 wherein both of the electrodes of the said differential ionization detector are operated by square wave pulsed current.

4. The method of claim 1 wherein the said measured output of the said differential ionization detector is recorded.

5. In an appartus for analyzing components of a fluid mixture comprising in combination, first and second columns filled with materials that selectively retard passage therethrough of the constituents of a fluid mixture, means to introduce carrier gas into said columns, means to introduce sample contained in a reference fluid into said first column to be moved therethrough by said carrier gas, means to introduce a reference fluid into said second column to be moved therethrough by said carrier gas, improvements comprising a double ionization detector having two electrode burner means of opposite polarity wherein at least one of the electrode burners is operated by variable pulse width square wave pulsed current to establish signals representative of the composition of fluid from the said first and second columns, variable pulse width square wave pulse generator means operatively connected to said double ionization detector means, and means to integrate said signals and to thereby form a resultant signal representative of the differences of compositions of the fluid of the first and second columns.

6. The apparatus of claim 5 wherein a direct current source is operatively connected to one of the electrodes of the said double ionization detector, and the said square wave pulse generator means is operatively connected to the other said electrode of the said double ionization detector.

7. The apparatus of claim 5 wherein both of the electrodes of said double ionization detector means are operatively connected to said square wave pulse generator means.

8. The apparatus of claim 5 wherein a heating means is associated with said first and second chromatographic column means, and a first fluid flow rate controller is operatively connected between the said first chromatographic column and the said double ionization detector, and a second fluild flow rate controller is operatively connected between said second chromatographic column and said double ionization detector.

9. The apparatus of claim 5 wherein said means to integrate said signals is an amplified means, and said amplifier means is operatively connected to a recording means.

10. An apparatus for detecting combustible constituents of a fluid mixture comprising, in combination, first and second combustion chambers, a collector electrode extending into the top of said first and second combustion chambers, a first electrode extending into the bottom of said first combustion chamber, a second electrode of opposite polarity from said first electrode extending into the bottom of said second combustion chamber, a first conduit means extending into the bottom of said first combustion chamber, a second conduit means extending into the bottom of said second combustion chamber, said first and second conduit means adapted to allow introduction of combustible matter to be burned in said first and second combustion chambers, respectively, means connecting with said first and second conduit means to introduce hydrogen and free-oxygen containing gas to the said first and second combustion chambers, variable pulse width square wave pulse generator means to supply at least one of the said electrodes with square wave pulsed current to establish signals representative of the composition of the said combustible matter burning in said first and second combustion chambers and amplifier means operatively connected to said collector electrode to integrate said signals and to thereby form a resultant signal being representative of the differences of compositions of the said combustible matter in the said first and second combustion chambers.

11. Apparatus of claim 10 wherein a direct current source is operatively connected to one of the said electrodes, and the said square wave pulse generator means is operatively connected to the other said electrode.

12. Apparatus of claim 10 wherein both of the said electrodes are operatively connected to said square wave pulse generator means.

References Cited
UNITED STATES PATENTS

| | | | |
|---|---|---|---|
| 3,112,640 | 12/1963 | Platt | 73—23 |
| 3,129,062 | 4/1964 | Ongkiehong, et al. | 23—255 |
| 3,366,456 | 1/1968 | Andreatch et al. | 23—230 |

JAMES J. GILL, *Primary Examiner.*

VICTOR J. TOTH, *Assistant Examiner.*

UNITED STATES PATENT OFFICE
CERTIFICATE OF CORRECTION

Patent No. 3,443,415                                May 13, 1969

Edwin K. Clardy

It is certified that error appears in the above identified patent and that said Letters Patent are hereby corrected as shown below:

Column 5, line 72, "fiuctuating" should read -- fluctuating --. Column 6, line 60, "fluild" should read -- fluid --; line 64, "amplified" should read -- amplifier --.

Signed and sealed this 24th day of March 1970.

(SEAL)
Attest:

Edward M. Fletcher, Jr.

Attesting Officer

WILLIAM E. SCHUYLER, JR.
                                                  Commissioner of Patents